_United States Patent_ [19]

Singh et al.

[11] 4,332,536
[45] Jun. 1, 1982

[54] HYDRAULIC TIRE PRESS

[75] Inventors: Anand P. Singh, Youngstown, Ohio; Daniel Schichman, Trumbull, Conn.

[73] Assignee: NRM Corporation, Akron, Ohio

[21] Appl. No.: 138,589

[22] Filed: Apr. 9, 1980

[51] Int. Cl.³ .................. B29H 5/02; B29H 5/08
[52] U.S. Cl. .................. 425/33; 425/34 R; 425/40; 425/47
[58] Field of Search ............... 425/11–47, 425/28 P, 60

[56] References Cited

U.S. PATENT DOCUMENTS

| 1,569,551 | 1/1926 | Kuhlke | 425/47 |
|---|---|---|---|
| 1,870,255 | 8/1932 | Krause et al. | 425/47 |
| 1,916,422 | 7/1933 | Heston | 425/32 |
| 2,198,493 | 4/1940 | Freeman | 425/40 |
| 2,200,871 | 5/1940 | Bosomworth | 425/47 |
| 2,240,010 | 4/1941 | Bosomworth | 425/47 |
| 2,254,415 | 9/1941 | Boyd | 18/17 |
| 2,279,540 | 4/1942 | Voth et al. | 425/36 |
| 2,291,506 | 7/1942 | Shook et al. | 425/47 X |
| 2,339,553 | 1/1944 | Bosomworth et al. | 425/34 |
| 2,393,503 | 1/1946 | Bosomworth et al. | 425/47 |
| 2,424,915 | 7/1947 | Bosomworth et al. | 425/40 |
| 2,730,763 | 1/1956 | Brundage | 425/33 |
| 2,736,059 | 2/1956 | Frank | 425/33 |
| 2,869,190 | 1/1959 | Schofield | 22/68 |
| 2,979,798 | 4/1961 | Price | 425/60 |
| 2,980,013 | 4/1961 | Swick | 100/257 |
| 2,981,977 | 5/1961 | Fanner | 425/47 X |
| 2,987,763 | 6/1961 | Hammesfahr | 425/47 |
| 3,054,141 | 9/1962 | Hammesfahr | 425/34 |
| 3,154,814 | 11/1964 | Fike | 425/25 |
| 3,170,187 | 2/1965 | Brundage | 425/38 |
| 3,214,791 | 11/1965 | Ericson et al. | 425/28 P |
| 3,336,635 | 8/1967 | Soderquist | 425/33 |
| 3,337,918 | 8/1967 | Pacciarini et al. | 18/17 |
| 3,442,992 | 5/1969 | Wright | 425/60 X |
| 3,474,499 | 10/1969 | Holmes | 425/47 |
| 3,477,100 | 11/1969 | Pech et al. | 425/34 |
| 3,522,626 | 8/1970 | Balle | 425/38 |
| 3,590,437 | 7/1971 | Onnis et al. | |
| 3,611,499 | 10/1971 | Getty | 18/18 F |
| 3,697,212 | 10/1972 | Herbst | 425/450 |
| 3,770,858 | 11/1973 | Ireland | 264/36 |
| 3,816,217 | 6/1974 | Barefoot | 156/394 |
| 3,914,975 | 10/1975 | Kawano | 72/389 |
| 3,936,251 | 2/1976 | Billey | 425/33 X |
| 3,988,077 | 10/1976 | Naratov et al. | 425/33 |
| 4,013,389 | 3/1977 | MacMillan | 425/47 X |
| 4,022,554 | 5/1977 | MacMillan | 425/43 X |
| 4,025,251 | 5/1977 | Cantarutti | 425/31 |
| 4,035,118 | 7/1977 | MacMillan | 425/25 |
| 4,076,473 | 2/1978 | MacMillan | 425/19 |
| 4,120,193 | 10/1978 | Tomsic et al. | 425/33 X |
| 4,130,384 | 12/1978 | MacMillan | 425/25 |
| 4,140,454 | 2/1979 | Calori | 425/190 |
| 4,212,605 | 7/1980 | MacMillan | 425/43 X |

FOREIGN PATENT DOCUMENTS 2001896 7/1978 United Kingdom .

OTHER PUBLICATIONS

Krupp Magazine Advertisement.

_Primary Examiner_—J. Howard Flint, Jr.
_Attorney, Agent, or Firm_—Maky, Renner, Otto & Boisselle

[57] ABSTRACT

A dual cavity hydraulic tire press utilizes a single long stroke piston-cylinder assembly vertically positioned substantially in line with the center of gravity of the vertically movable upper mold sections, the latter being supported on the underside of the outer ends of a shallow V-shaped beam which is mounted for vertical movement on a readily removable column or post. In the closed position of the press the top mold cavities are locked to the base of the press by rotatable bayonet locks. Four short stroke hydraulic clamp piston-cylinder assemblies are positioned beneath each bottom mold section to achieve clamping pressure during cure and are provided with extended coolant passages between the clamp actuating fluid and the heat of the mold cavity to preclude degradation of the fluid employed.

42 Claims, 15 Drawing Figures

HYDRAULIC TIRE PRESS

This invention relates generally as indicated to a tire curing press and more particularly to a hydraulic tire curing press which is less costly to build and maintain than conventional mechanically operated presses.

BACKGROUND OF THE INVENTION

Conventional mechanically operated tire curing presses utilize large side plates on either side of a base which include cam slots for the movement of trunnions on opposite ends of a significant beam operated by links connected to bull gears on the outside of each side plate. The bull gears are usually driven by a substantial electric motor through a worm gear reduction drive. The beam beneath which the upper mold sections are supported, the links, the bull gears and the mechanical drive are utilized to hold the press closed to resist the significant internal pressures achieved during tire curing.

The beam, side plates, links and bull gears together with the drive for the bull gears add significantly to the weight of the press not to mention its cost. Moreover, the beam, links, side plates and bull gears significantly add to the envelope of the press requiring substantial space and height, particularly for presses of large size. Moreover, the above-noted components of a mechanical press not only limit access to the mold cavities but also tend to restrict the amount and type of insulation which can be provided around the mold cavity thus, in reality, enhancing the energy inefficiency of a conventional tire press.

Attempts have been made to eliminate the above-noted components of the usual mechanical press and reference may be had to Cantarruti U.S. Pat. No. 4,025,251 entitled *VULCANIZER LOCK MEANS*, for an example. However, even with a lock such as a rotating bayonet ring, the internal pressures of the press tend to distort the mold parts in the absence of a high pressure preloading clamp which is normally achieved by the aforenoted components in a mechanical press. Thus, under such pressures the mold sections may actually tend to dish or become concave, particularly in the area of the center mechanism, requiring reactant clamping forces. Also, high clamping pressures over the entire mold or platen area restrict the amount and type of insulation employed, which in conventional presses may require frequent replacement. If the area of application of the clamping forces can be reduced, more efficient insulation can be used around the mold obtaining a more energy efficient cure. Attempts have been made to solve some of the noted problems with hydraulic presses. However, because of the high heat involved in tire curing and the deleterious effect that hydraulic fluid has on uncured or cured rubber, such attempts have not generally met with success.

For example, in some hydraulic presses the high heat involved has so degraded the hydraulic fluid used for clamping pressures that such fluid has been required almost continually to be replaced. Moreover, if hydraulic leaks develop, which is to be expected, any leaking fluid which may fall on either an uncured tire or a hot cured tire leaving the press can result in a scrap tire.

Accordingly, it is highly desirable to provide a tire press eliminating the mechanical components noted above but providing fluid operating components together with a mechanical lock with such components being positioned either beneath or laterally offset from the path of the uncured and then cured tire through the press. Moreover, if hydraulic fluid is employed, it is important to isolate the hydraulic fluid of the system from the high heat of the curing operation. It is also important in a fluid operated or hydraulic press to provide a mechanical blocking system which will preclude the mold parts from separating significantly in the event of the loss of hydraulic or fluid pressure.

SUMMARY OF THE INVENTION

With the present invention the upper mold cavities of a dual cavity press are supported beneath the outer ends of a relatively small shallow-V-shaped beam which is mounted for movement on a readily removable column and powered by a relatively long stroke fluid or hydraulic piston-cylinder assembly positioned in vertical alignment with the center of gravity of the upper mold cavities and beam. The lower mold cavity is mounted in a base with which the upper mold cavity is mechanically locked by a rotating bayonet ring when the press is closed. Hydraulic clamps which comprise four relatively short stroke large hydraulic piston-cylinder assemblies are positioned beneath the bottom mold section in the base and may be extended toward the top mold section when the latter is mechanically locked to the base. The hydraulic piston-cylinder assemblies are provided with coolant passages extending substantially throughout the projecting rod of the piston-cylinder assembly to isolate the heat of the curing operation from the hydraulic fluid. Mechanical stops or other positioning devices are utilized for mold height adjustment and for preventing the molds from separating unduly in the event of the loss of fluid pressure. With the positioning of the clamps beneath the mold and the single hydraulic piston-cylinder assembly between the molds operating the opening and closing movement of the presses, hydraulic fluids cannot contaminate the product moving through the press. Moreover, with the heat isolation of the hydraulic fluids from the heat of the cure, hydraulic degradation is avoided.

The press also includes a safety bar which maintains its position above a pit, if employed, but always below exposed extended segment molds of a sectional mold mechanism. The safety bar is held stationary during the final closing or initial opening movements of the top mold section but otherwise moves with the top mold section at the noted position with relation to the extended segment molds. To facilitate change of molds, the safety bar may be moved to a certain position and held thereby with pins, the removal of which automatically stops all press functions.

It is accordingly a principal object of the present invention to provide a tire curing press which is less costly to construct and to maintain.

Another principal object of the present invention is the provision of a tire curing press which provides greater insulation access to the mold cavities with a reduced envelope.

Still another important object of the present invention is the provision of a tire curing press having greater energy efficiency.

It is also an important object to provide a tire press wherein the molds and platens may be more efficiently insulated.

A further important object is the provision of an hydraulic tire curing press wherein the path of material through the press is out of the path of any hydraulic leakage.

Still another important object is the provision of an hydraulic tire curing press wherein the hydraulic fluid actuating the components of the press is isolated from the heat generated by the curing operation.

Yet another important object is the provision of a tire curing press which minimizes beam or frame distortions and eliminates angular preloading all of which may cause excessive flash.

A further object is the provision of an hydraulic tire curing press utilizing simplified mold height adjustment mechanisms for the hydraulic clamp.

Another object is the provision of a sectional mold operator incorporating a simplified stroke limiter.

A further object is the provision of an hydraulic tire curing press incorporating mechanical stop means precluding significant opening of the mold sections in the event of the loss of hydraulic pressure.

Yet another object is the provision of a safety bar for such press which is mounted on the vertically movable upper mold section in a manner that the bar may be held at a predetermined position during the final closing and initial opening movements of the top mold, yet when moving with the upper mold section will be below extended segment molds.

It is also an object of the present invention to provide a tire curing press wherein maintenance, and mold changes are greatly facilitated.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention are employed.

In said annexed drawings:

FIG. 6 is a fragmentary vertical section of a press in accordance with the present invention illustrating another form of mold height adjustment;

FIG. 14 is a fragmentary broken elevation of the sectional mold operator and its stroke limiter; and FIG. 15 is a horizontal section taken from the line 15—15 of FIG. 14.

Figure 1:
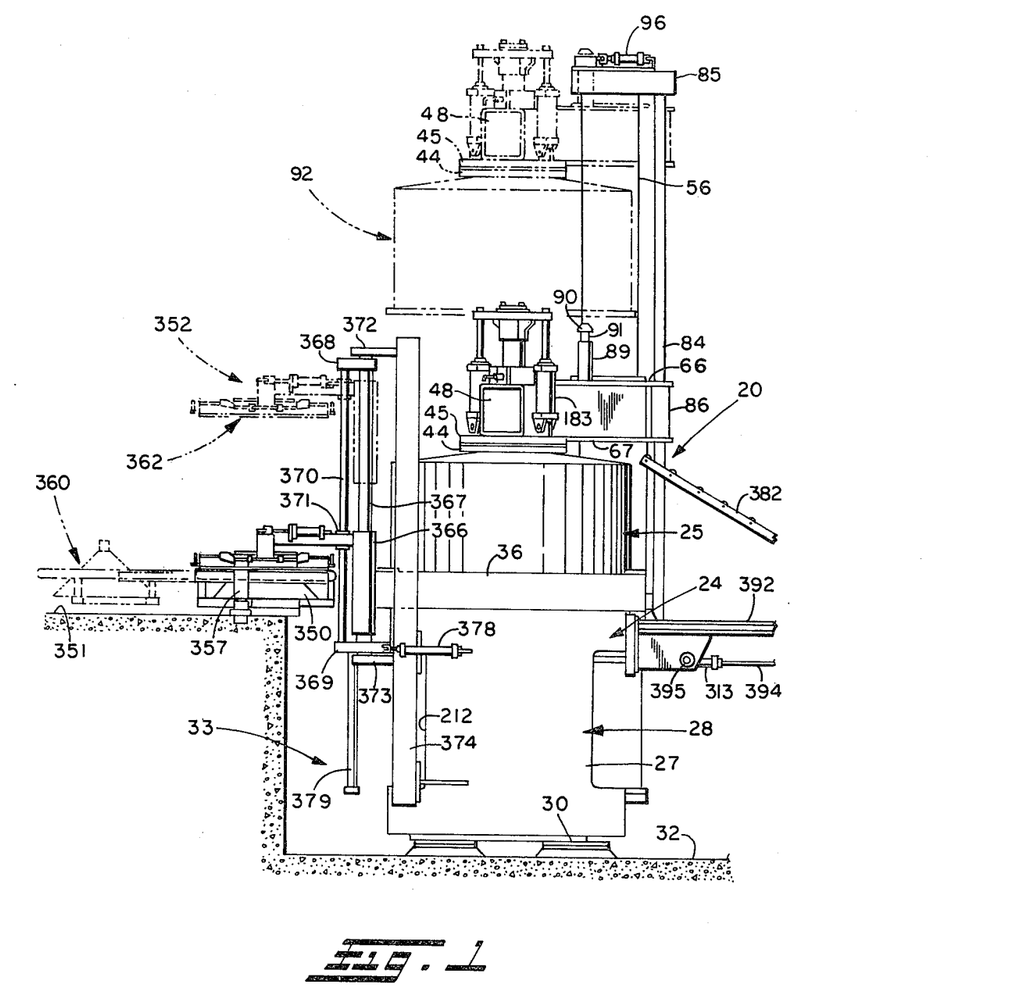
FIG. 1 is a side elevation of a press in accordance with the present invention illustrating the press open in phantom lines.
Figures 2, 3:
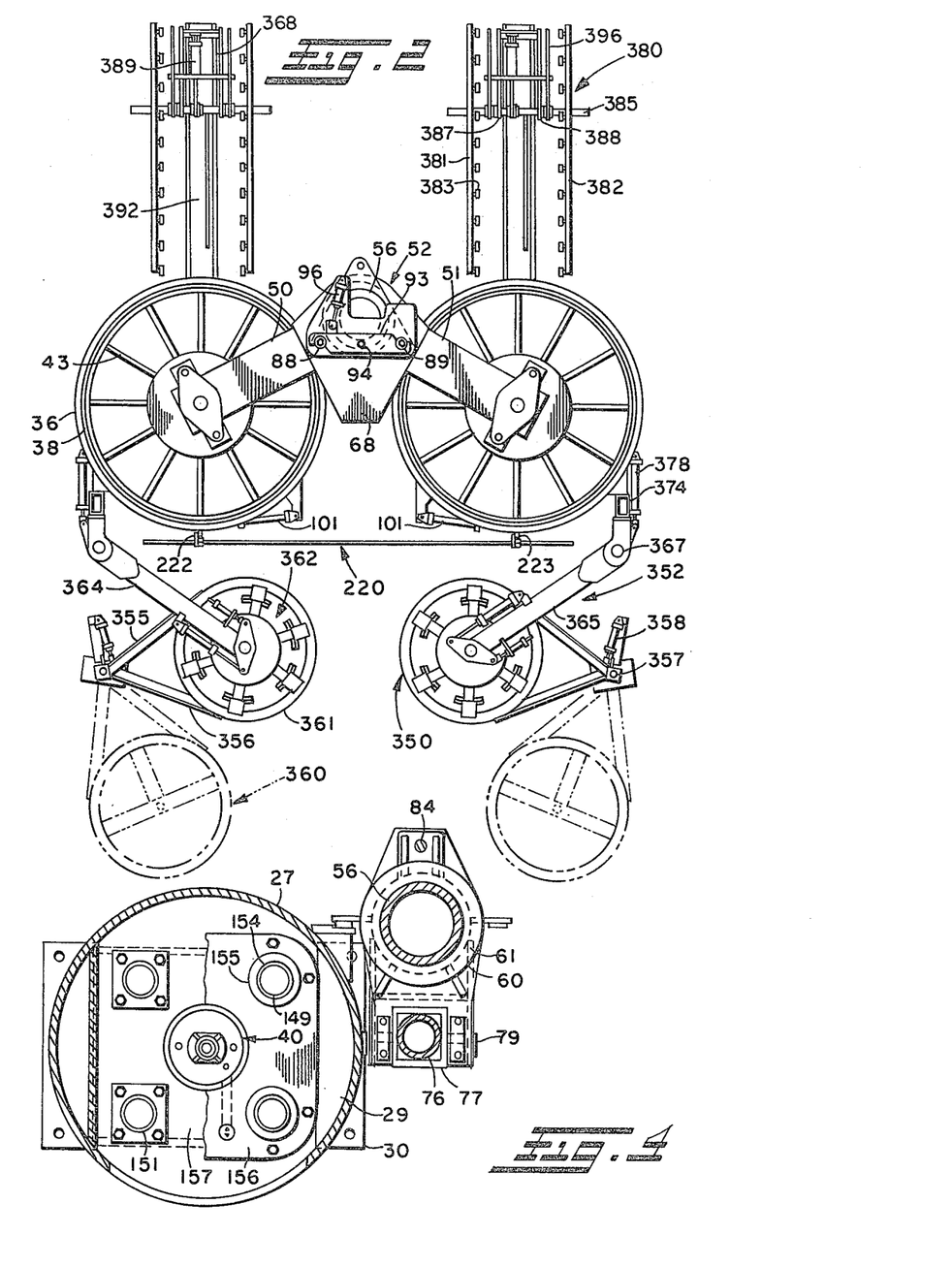
FIG. 2 is a top plan view of the press as seen in FIG. 1.
FIG. 3 is an enlarged front elevation of the press partially broken away and in section and illustrating a preferred clamp cylinder arrangement.

Referring to FIGS. 1 through 3, it will be seen that the press shown generally at 20 comprises two side-by-side mold cavities shown generally at 21 and 22. As illustrated for the left hand cavity seen in FIG. 3, each cavity includes a fixed bottom cavity 24 and a movable top cavity 25.

The bottom cavity 24 is formed by the cylindrical wall 27 of base 28 and a horizontal plate 29 extending across the cylindrical plate near its upper end. Accordingly, the press comprises two side-by-side bases 28 which may be mounted on footers 30 for vertical plumbness on the floor 32 of a pit 33. The pit is seen more clearly in FIG. 1.

On the upper end of each cylindrical wall or frame 27 of the base 28 there is provided a horizontally extending flange or lip 35 on which is journaled a two-part locking ring 36.

The upper cavity 25 may be formed of a cylindrical shell 38 which is provided with a transverse plate 39 near the upper end. It is noted that both of the plates 29 and 39 are provided with holes in the center, the hole in the center of the plate 29 accommodating center mechanism 40 while the hole in the top plate 39 accommodates the sectional mold actuator 41. Above the plate 39 there is provided a plurality of radially extending gusset plates 43 seen more clearly in FIG. 2, the inner ends of which underlie bolster 44. The gussets are secured to the outer shell 38, the plate 39 and to the bolster 44 to form a rigid top structure.

The bolster 43 is secured to the underside of a similarly profiled plate 45 by the fasteners 46, such plate being positioned and secured under the outer end of shallow V-shape beam 48. The shallow V-shape of the beam is seen more clearly in FIG. 2. Thus, each upper mold cavity is positioned on the outer underside of such beam.

Referring now to FIG. 2, it will be seen that the beam 48 includes two projecting arms 50 and 51 which extend from a center frame 52 which is secured to the upper end of a vertically elongated sleeve which is journaled at the top as indicated at 54 and at the bottom as seen at 55 on tubular post or column 56. The tubular column 56 projects upwardly from a sleeve or housing 60 extending between top and bottom frames 61 and 62 all secured between the base frames 28 of the bottom cavities 24. It is noted that the tubular column 56 may readily be removed from the support sleeve 60 for shipment and assembly purposes.

As seen more clearly in FIGS. 2 and 3, the frame 52 includes top and bottom plates 66 and 67 which project into the notch of the shallow beam with the trapezoidal profile seen in FIG. 2 at 68. The plates are rigidly interconnected within such trapezoidal profile by the gussets or brace plates 70 and 71 and beneath the bottom plate 67 and such brace plates there is secured an eye 72 for the pin 73 connecting the eye to the clevis 74 on the end of rod 75 of piston cylinder assembly 76. The piston cylinder assembly 76 is supported by collar 77 pivoted on trunnions 78 and 79 which are in turn supported by frames 80 and 81, respectively projecting toward the viewer from the sleeve frame 60 as seen in FIG. 3. The pivot 73 and the piston-cylinder assembly 76 vertically aligned therebeneath is beneath the center of gravity of the beam 48 and the upper mold cavities or sections supported beneath the outer ends thereof.

As seen more clearly in FIG. 1, a vertically extending guide rod 84 extends parallel to the column 56 on the side opposite the piston-cylinder assembly 76. The guide rod is secured at its bottom to the framing of sleeve 60 and at its top to column cap 85. The frame plates 66 and 67 have a sleeve 86 extending therebetween at the rear of the column 56 which is provided with bushings riding on the guide rod 84. Such construction precludes the beam 48 from rotating about the axis of the column.

It is noted that the top plate 66 adjacent the column 56 includes two upwardly extending projections 88 and 89, each of which includes a pilot tip 90 and an annular groove or recess 91. When the piston-cylinder assembly 76 extends to elevate the beam 48 and the upper mold cavities to the open or phantom line position seen at 92 in FIG. 1, such projections extend through the post cap 85 and the grooves 91 are aligned with semi-circular oppositely facing recesses in safety lock 93 which is pivoted at 94 to the top of the post cap 85. A relatively small short stroke piston-cylinder assembly 96 is employed to pivot the safety lock about its pivot 94 to engage the oppositely disposed recesses in the annular grooves 91 when the projections 89 project through the post cap, thus mechanically locking the press in its elevated or open position as seen at 92. The press when locked open accordingly will remain open even in the event of a failure of fluid pressure in the piston cylinder assembly 76.

When the press closes, the piston-cylinder assembly 96 retracts clearing the latch mechanism 93 and the piston-cylinder assembly 76 retracts permitting the frame 48 and the upper mold cavities 21 and 22 to descend. When the press is open, the lock ring 36 will be in its open position as achieved by the piston-cylinder assemblies 101 mounted immediately subjacent the ring 36 as seen in FIG. 3.

Figures 8, 9, 12, 13:
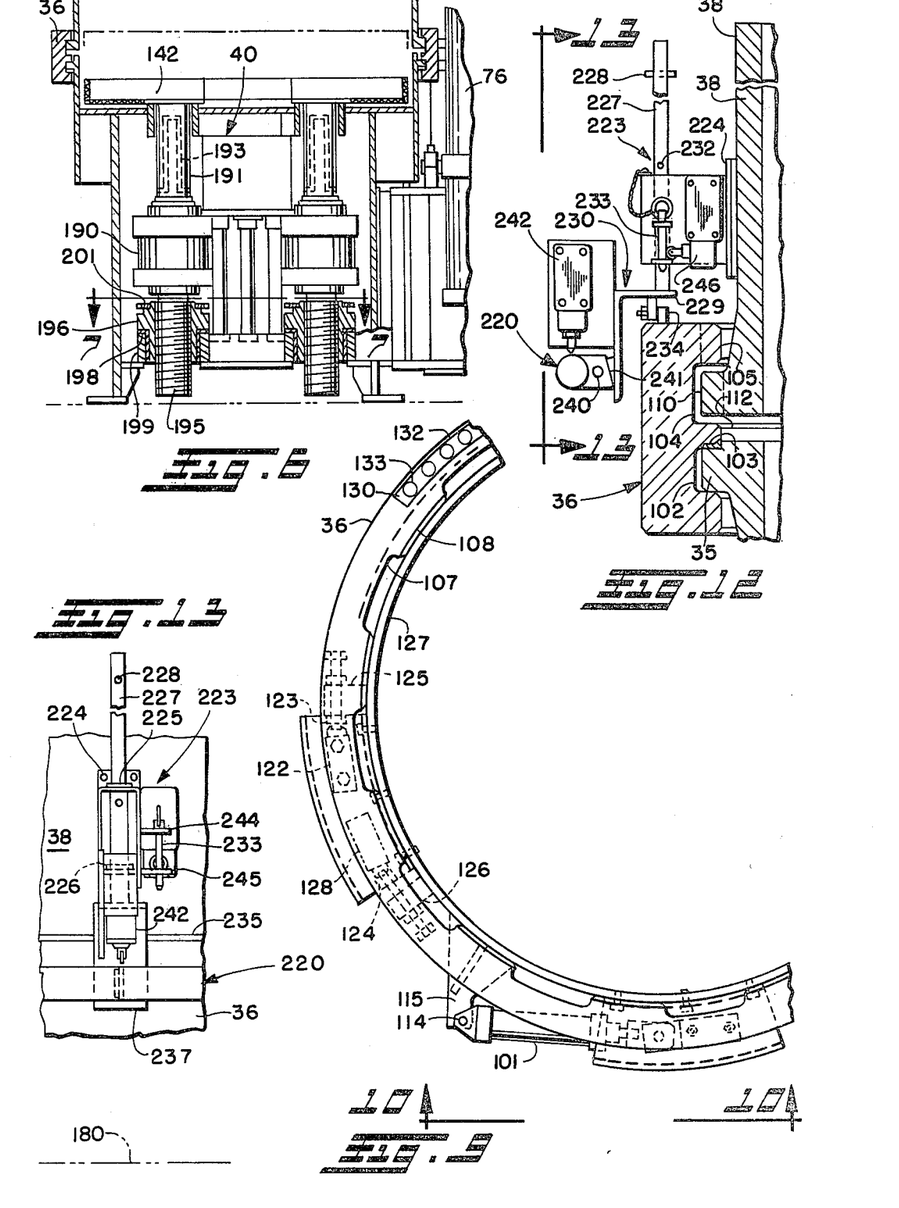
FIG. 9 is a fragmentary plan view illustrating the breech lock ring, its actuator and the adjustable stops.
FIG. 12 is a fragmentary detail of the safety bar mechanism in its lower most position resting on the locking ring.
FIG. 13 is a fragmentary front elevation of a supporting bracket for the safety bar as seen from the line 13—13 of FIG. 12.
Figure 10:
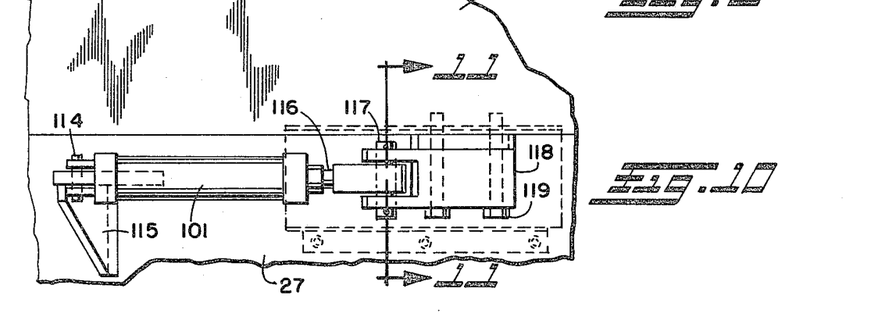
FIG. 10 is an enlarged view of the actuator as taken substantially from the line 10—10 of FIG. 9.

With reference to FIG. 12, it will be seen that the ring 36 includes a lower inwardly directed slot 103 which embraces the flange or projecting lip 35 on the frame plate 27 forming the lower mold cavity 27. The upper side of the slot 102 may be provided with a bronze clad bearing surface seen at 103. The ring 36 is thus journaled on the flange 35 for rotational movement.

Above the slot 102 is a somewhat larger inwardly directed slot 104 forming an upper leg 105 which is formed with alternating notches and teeth seen respectively at 107 and 108 in FIG. 9. The lower end of the cylindrical wall or shell of each upper cavity is provided with an enlarged radially projecting flange 110 which is also formed with alternating teeth and notches with the teeth being designed to fit vertically through the notches 107 in the open position of the ring 36 and to lie beneath the teeth 108 of such ring when the ring is rotated to its closed position.

With the ring in the open position, and the top mold cavities descending, the teeth of the flange 110 will pass through the notches in the upper leg of the ring coming to rest at approximately the position seen in FIG. 12 with the teeth of the flange being substantially aligned or centered in the groove 104. If slight over travel occurs, the teeth of the flange 110 will simply engage the projecting middle leg 112 of the E-shape ring. When the top mold cavities are in the position seen in FIG. 12, the piston-cylinder assemblies 101 are extended rotating the ring to move the teeth 108 of the leg 105 above the teeth of the flange 110 mechanically locking the top mold cavities to the bottom mold cavities.

The blind end of the piston-cylinder assemblies may be pivotally connected at 114 to a bracket 115 projecting from the wall of the frame plate 27. The rod 116 of the assembly 101 is pivotally connected at 117 to clevis block 118 secured by fasteners 119 to the underside of the ring 36. Housing 120 covers the moving parts of the assembly 101.

As seen in FIG. 9, the ring may be provided with a projecting stop 122 engaging adjustable stop 123 in the open position of the ring and adjustable stop 124 in the closed position. The stops may be adjustably mounted and secured on brackets 124 and 126, respectively projecting from the frame wall 27. In the extended position of the piston-cylinder assembly 101 the stop 122 will move to the position 128. Such stops insure that the teeth are in the proper adjusted position for the proper movement of the teeth through the notches and the proper alignment position when the press is closed and mechanically locked.

Also as seen in FIG. 9, the ring 36 may be made in two 180° segments which are held together by top and bottom circular straps seen at 130 holding the ring segments in abutting relation as seen at 132. Fasteners 133 may be employed to secure the straps to the ring and thus the ring segments to each other. With the construction illustrated, the ring may very quickly be assembled on and removed from the press.

Figure 5A:
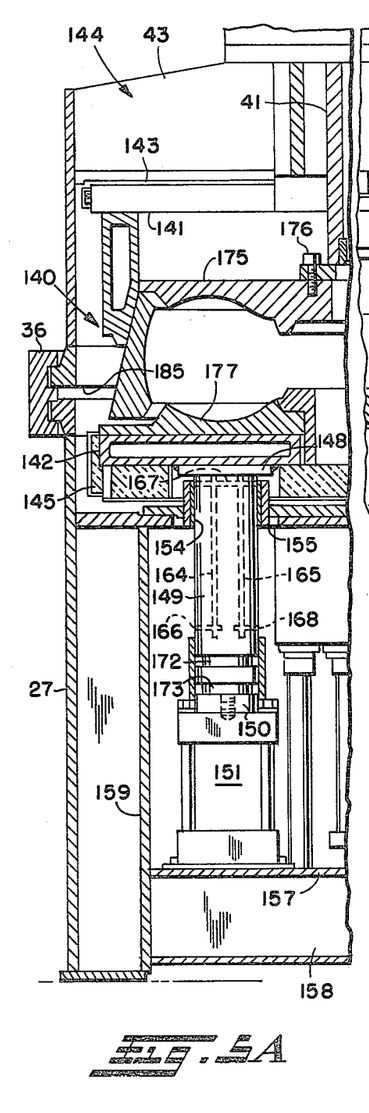
FIGS. 5A and 5B are fragmentary vertical sections through the clamp cylinders illustrating the clamp cylinders fully opened, and fully closed, respectively.
Figure 5B:
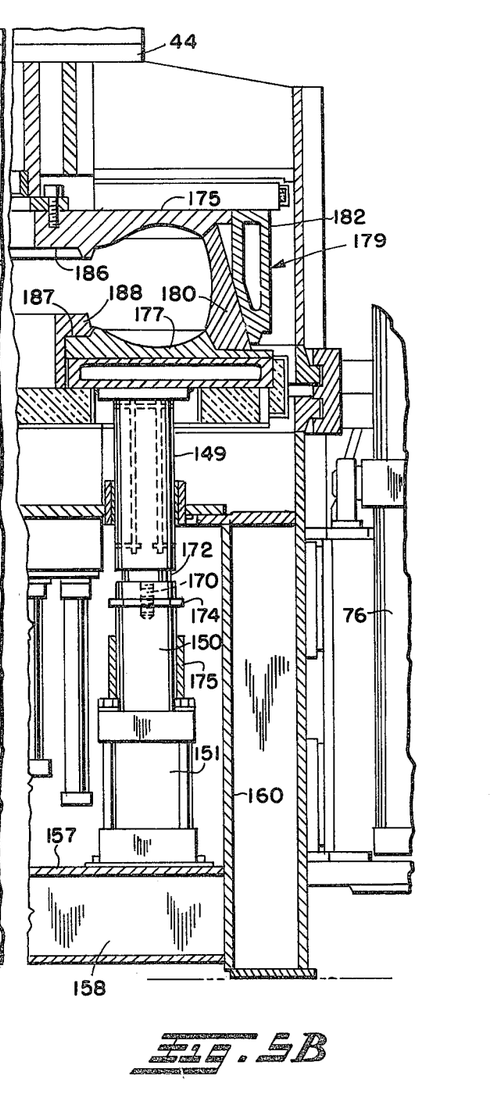

Referring now to FIGS. 3 and 5A and 5B, it will be seen that when the press closes and is mechanically locked, the upper and lower cavities of each mold section are joined to form a single cavity or chamber in which is situated a fixed upper platen 141 and a vertically movable bottom platen 142. The top platen 141 may be insulated from the plate 39 as seen at 143. The insulation plate 143 may be of the type disclosed in the copending application of Daniel Shichman, Ser. No. 68,618, filed Aug. 22, 1979, now abandoned, entitled "Tire Curing Press with Improved Energy Efficiency." The insulating plate 143 is the only insulating plate in the press of the present invention which is under pressure load. In addition to the insulating plate 143, the top portion of the upper cavity above the plate 39 may be provided with loose insulation such as fiberglass or other material situated between the gusset plates 43 as indicated at 144 in FIG. 5A.

As seen in FIG. 5A the bottom platen 142 may be surrounded both below and at the sides with an insulating material seen at 145 which never is under compression pressure.

The bottom platen has secured thereto four quadrant spaced pads 148 which form the upper ends of relatively large rods 149 which are secured to and form extensions of the rods 150 of hydraulic piston-cylinder assemblies 151.

Figures 3, 4, 5:
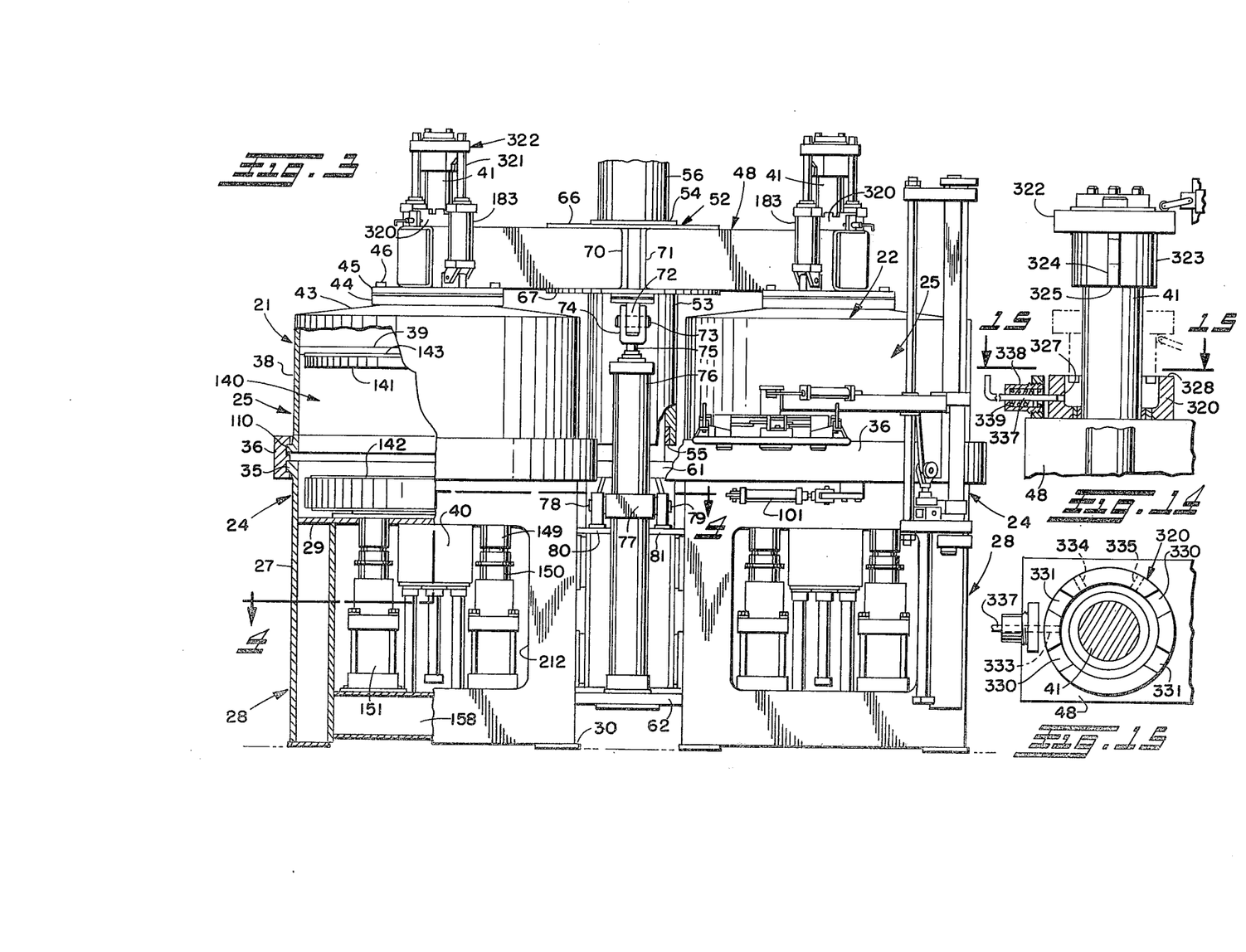
FIG. 4 is a fragmentary horizontal section taken substantially on line 4—4 of FIG. 3.

Each rod extension is guided in a bushing 154 mounted in a sleeve 155 secured to and through a corresponding hole in adapter plate 156. The adapter plate 156 is mounted on the plate 29 and may be of the profile configuration seen in FIG. 4.

The blind end of each piston-cylinder assembly 151 is mounted on the top plate 157 of a frame 158 extending between internal vertical plates 159 and 160 as seen in FIG. 5. In this manner the lower end of each of the hydraulic clamp-piston-cylinder assemblies 151 is rigidly and firmly supported at the bottom of the base of each cavity of the press.

As in a conventional platen press, both the top and bottom platens 141 and 142 are hollow and a heating medium such as steam is circulated therethrough to facilitate the curing of a tire in the mold cavity. In order to isolate the hydraulic fluid in the piston-cylinder assemblies 151 from the high heat of the curing process, the rod extensions 149 are provided with cooling passages as seen at 164 and 165 in FIGS. 5A and 5B. The passages may be drilled in the rod extensions with the drilled holes plugged to provide an inlet passage seen at 166 with the cooling water then circulating along the length of the rod through passage 164 and then transferring from the passage 164 to the passage 165 through connecting passage 167 and exiting at the bottom of passage 165 through the port 168. The top of the passages 164 and 165 and the ends of passage 167 may be plugged.

In this manner the cooling of the rod extension provides an isolation or barrier between the high heat of the press and the hydraulic fluid within the piston-cylinder assemblies 151. This avoids the necessity of frequent replacement of the hydraulic fluid due to heat degradation.

The rod extensions 149 may be secured to the rods 150 by means of studs in the tapped holes indicated at 170.

It is also noted that each rod and rod extension is provided with two vertically spaced annular grooves as seen at 172 and 173, either of which may accommodate a removable stop ring or collar 174. The stop collar is designed to cooperate with the upper end of a stop tube 175 of selected length which may readily be positioned around the piston 150 projecting from the assembly 151. For example, in this preferred form of the invention, the stop collar and stop tube may be utilized for both mold height adjustment and to preclude the molds from opening a significant extent in the event of loss of pressure in the piston-cylinder assemblies 151. For example, the collar 174 may be positioned in the upper groove 172 when the press is used with 19 to 22 inch (48.3 cm. to 55.9 cm.) molds. It may be positioned in the bottom groove if the press is utilized for making tires with 16 to 19 inch (40.6 cm. to 48.3 cm.) molds. If no collar is employed and the pistons bottom, a 25 inch (63.5 cm.) mold may be employed, thus providing a 16 to 25 inch range. It will be appreciated that the upward stroke of the cylinder assemblies 151 is limited by the mold thicknesses employed and the return stroke is limited by the position of stop ring 174 in one of the two grooves provided on the piston rod assembly if employed. This not only limits the stroke of the piston-cylinder assemblies to that needed for the particular molds involved, but also precludes excessive opening of the molds in the event hydraulic pressure in the piston-cylinder assemblies is for any reason lost.

In FIG. 5A the tooling or molds forming the tire cavity are shown in their open position and the piston-cylinder assembly 151 is shown fully retracted. The tooling includes an upper mold part 75 or plate which is secured at 176 to the sectional mold actuator 41. The lower mold part or plate 177 is secured directly to the bottom platen 142. As illustrated, the molds or tooling include a sectional mold mechanism shown generally at 179 which comprises a series of sectional or tread molds 180 mounted for vertical movement on a steam jacketed wedge ring 182. The ring is secured to the upper platen 141. In a conventional manner, the tread sectors 180 are mounted for sliding movement with dove-tail connections both with respect to the wedge ring 179 and upper mold plate 175. As the sectional mold actuator 41 is moved vertically by the piston-cylinder assemblies 183 on top of the press, the top mold plate or sections 175 will move vertically toward and away from the platen 141. This movement causes the tread sectors of the sectional mold mechanism to move radially from the fully closed position seen in FIG. 5B to the fully open position seen in FIG. 5A. When fully closed, the tread sectors 180 will seat against the provided shoulders in the top and bottom mold parts forming the outer cavity of the tire to be formed. When fully opened, the tread sectors 180 may project below the bottom edge 185 of the upper cavity forming shell 38.

Both the upper and lower mold parts may be provided with recesses seen at 186 and 187, the former accommodating the top plate of the center mechanism 40 while the latter accommodates the vertically movable bottom bead ring 188. The center mechanism may preferably be of the type shown in applicants' copending application Ser. No. 138,658 filed even date herewith entitled "Tire Press", now abandoned.

Figures 7, 8, 11:
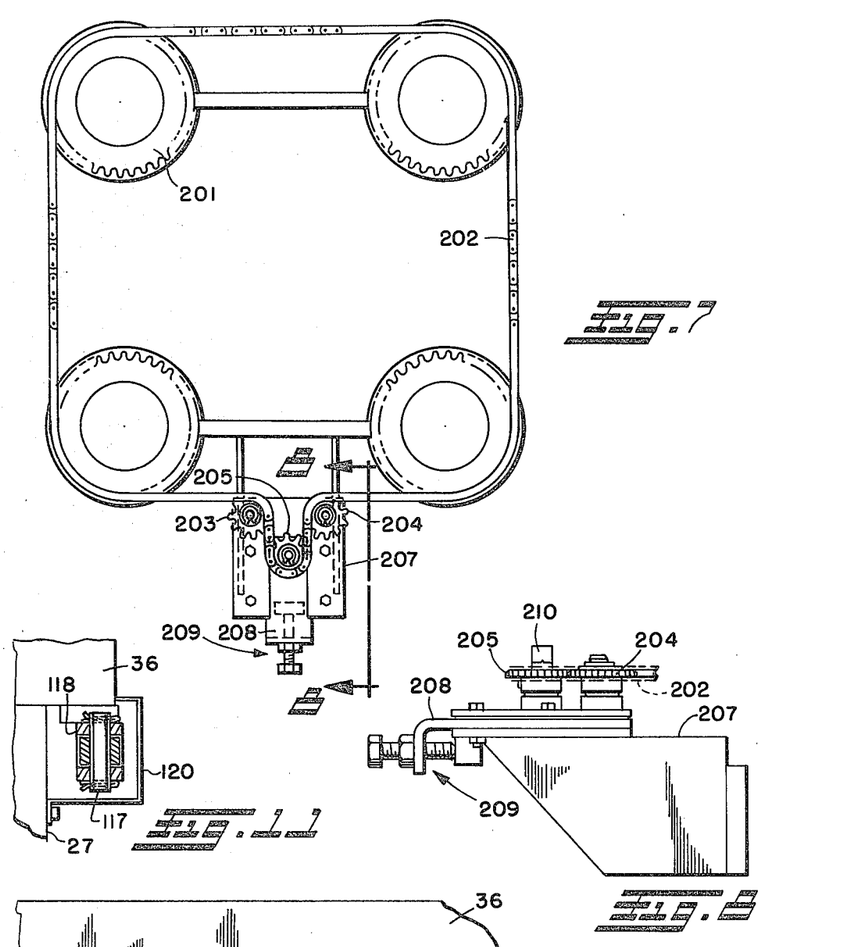
FIG. 7 is an enlarged schematic horizontal section illustrating the mold height adjustment drive of FIG. 6.
FIG. 8 is an enlarged vertical section taken substantially on the line 8—8 of FIG. 7.
FIG. 11 is a fragmentary detail of the actuator pivot connection as seen from line 11—11 of FIG. 10.

An alternative form of mold height adjustment is illustrated in FIGS. 6, 7 and 8. In such embodiment, the four hydraulic clamp piston-cylinder assemblies are illustrated at 190 and each includes elongated rods 191 supporting the bottom platen 142. Each rod is provided with the coolant passages seen at 193 extending throughout substantially the entire projecting length thereof. The piston-cylinder assemblies 190 are of somewhat shorter stroke than those illustrated, for example, in FIG. 3 or FIGS. 5 and 5A. The blind end of each piston-cylinder assembly is supported on a threaded shank or stud 195, each such shank being in threaded engagement with an internally threaded nut 196. The nut is provided with a shoulder 198 which is journaled in support plate or frame 199. The shoulder provides a thrust bearing surface for the nut. Each nut is provided with a sprocket as seen at 201 and a drive chain 202 extends around each sprocket in the manner seen more clearly in FIG. 7.

At the front of the press the chain also extends around three somewhat smaller sprockets 203, 204 and 205. The sprockets 203 and 204 are fixed and project upwardly from the bracket 207. The sprocket 205 is mounted on slide plate 208 which is horizontally adjustable with respect to the sprockets 203 and 204 by the adjustment mechanism seen at 209. The adjustment mechanism may be employed to control the tension of the chain 202. The sprocket 205 as seen more clearly in FIG. 8 has a projecting non-circular head 210 which may be utilized with a suitable tool to drive the chain 202 to rotate the respective nuts of the four clamp piston-cylinder assemblies uniformly vertically to adjust the same. In this manner, mold height adjustment is obtained and also the positioning of the piston-cylinder assemblies precludes with such mold height adjustment the opening of the mold parts beyond a significant extent in the event of the loss of hydraulic pressure.

It is noted that both the embodiments of FIG. 1 and FIG. 6 provide windows or access openings in the press base as seen at 212 so that the mold height adjustment, whether it be the collar and stop tube embodiment of FIG. 3 or the chain drive adjustment of FIG. 6, is easily made.

As seen more clearly in FIG. 2, a safety bar 220 is positioned across the front of the two cavities of the press. It is noted that the ring 36 for each mold cavity is positioned substantially at the top of the pit 33 as seen in FIG. 1 and it is desirable that the safety bar not go down into the pit. It is, however, also desirable that the safety bar when the press is opening and closing extend beneath the fully opened tread sectors 180 seen in FIG. 5A which may extend somewhat below the bottom edge 185 of the upper mold cavity. To hold the safety bar at a constant height during the final closing or initial opening movements of the press and yet permit it to be suspended beneath the projecting sectional mold parts, the lost motion mounting of the safety bar as seen in FIGS. 12 and 13 is provided.

The safety bar is suspended from two brackets 222 and 223 secured to the front of each upper mold cavity shell 38 as seen at 224. The bracket 223 is provided with top and bottom bushings 225 and 226 which accomodate vertically extending rod 227 for vertical movement therethrough. The rod is provided at its top with a transverse stop pin 228 and at its bottom is secured to the shorter horizontal leg of 229 of angle bracket 230. The rod is also provied with a transverse pin receiving hole 232 adapted to receive pin 233 in the mold changing mode of the machine.

Positioned beneath the short leg 229 of the bracket 230 is a roller 234 adapted to engage the top 235 of the lock ring 36. The longer vertical leg 237 of the bracket 230 supports the safety bar 220 through the offset pivot 240. Because of the configuration of the ear 241 connected to the safety bar 220 the safety bar cannot pivot downwardly about the pivot 240 but may pivot upwardly. Upward pivotal movement of the safety bar will trip limit switch 242 also mounted on the longer leg 237 of the bracket 230.

It is noted that the pin 233 is normally supported through aligned holes in laterally projecting plates 244 and 245. In such position, the pin activates limit switch 246. However, when pulled from its home position, it will deactivate the limit switch 246 stopping all press functions. When pulled from its home position it may be inserted in the hole 232 holding the safety bar elevated.

The roller 234 engages the top of the lock ring 36 as the press comes to its closed position and stops the downward movement of the safety bar so that it cannot get below the pit level or go too far down. The roller for each bracket allows the breech lock ring to rotate without resulting in any drag on the safety bar mechanism. When the press starts to open, the shell of the top mold cavity 38 will move upwardly a stroke of approximately 14 inches (35.6 cm.) before the pin 228 engages the top of the bracket 223. At this point, the safety bar 220 will ordinarily be below any fully extended tread mold sectors employed with the tooling. The safety bar continues in such down position throughout the balance of the opening and closing movement of the press to again come to a fixed position during the final closing movement of the press. It will be appreciated that any slight upward pressure on the bar throughout its length will trip the switches stopping the operation of the press.

Referring now to FIGS. 14 and 15 it will be seen that the sectional mold operator 41 for each cavity may be limited in its opening or downward stroke by a rotatable stop ring 320. The sectional mold sections 180 are closed by elevation of the operator 41 obtained by extension of the piston-cylinder assemblies 183. The rods 321 of such assemblies are connected to an operator cap 322. The cap includes a cylindrical sleeve 323 surrounding the upper end of the operator 41 and diametrically opposed gussets extend from the cap to the sleeve. Each gusset is provided with a projecting flat bottom edge seen at 325.

Journaled around the sectional mold operator 41 is the stop ring 320. The stop ring is L-shaped in radial section providing an internal recess 327 accomodating the lower end of the sleeve 323. As seen more clearly in FIG. 15 the top projecting edge 328 of the stop ring is provided with two sets of diametrically opposed recesses or notches seen at 330 and 331. The upstanding wall of the stop ring is also provided with three radially extending holes seen at 333, 334 and 335. Such holes accomodate spring loaded lock pin 337 mounted in housing 338 secured to the top of the beam 48. By pulling the lock pin to the left as seen in FIG. 14 against the pressure of the spring 339, the inwardly projecting end of the pin may be disengaged from the selected hole. In this manner then the stop ring is free to rotate about the axis of the sectional mold operator 41.

The opposed or paired recesses 330 and 331 are at different depths or elevations with respect to the top edge 328 of the wall and accordingly by rotating the stop ring 320 to the selected position, either the notches 330, 331 or the top edge of the wall as seen at 328 may be brought into abutment position with the bottom or contact edge 325 of the gussets 324. Each of the radially extending holes 333, 334 and 335 may have clearly marked on the exterior of the stop ring, the stroke limit provided by that position of the stop ring. In this manner three stop positions may be obtained. With the deepest pair of slots aligned with the gusset contact edge, a stroke limitation of approximately 9.5 inches or 24.2 cm. may be obtained. With the slots of lesser depth aligned in the manner indicated, a stroke of 8.81 inches or 22.4 cm. may be obtained. With the stop ring positioned so that the gusset contact edges 325 engage the top edge of the ring, a stroke limit of 8.10 or 20.6 cm. may be obtained.

In this manner, the sectional mold mechanism may readily be mechanically limited to the desired stroke in much the same manner as the clamp cylinders are in the preferred embodiment. The adjustment can readily and quickly be made in a highly simplified manner.

Operation

With particular reference to FIGS. 1 and 2, it will be seen that a load stand or pilot 350 may be mounted on the floor 351 immediately in front of the pit 33. The load stand or pilot is designed to position and center the green tire for pick up by the loader shown generally at 352. Each load stand includes tangential horizontal frames seen at 355 and 356 which support the load stand in cantilever fashion from pivot 357 projecting from the floor. A piston cylinder assembly 358 is provided for each load stand to swing the load stand to and from a phantom line position 360 to the full line position 361. Such a pivoting load stand is particularly useful for large size tires and where pits are involved. In this manner the operator or a lifting device may position the green tire on the load stand when it is in the phantom line position. When the loader is in its elevated position the load stand pivots to the full line position aligning the green tire with the chuck 362 of the loader. It is noted from FIG. 1 that the load stand actually partly moves the green tire out over the edge of the pit.

Each loader chuck 362 is mounted on the distal underside of swinging arms 364 and 365, the proximal ends of which each include vertically elongated sleeves 366 riding on cylindrical column 367. The column includes lateral top and bottom extensions seen at 368 and 369 which support a parallel guide rod 370 extending through a bushing in the respective arm as seen at 371. The entire assembly is pivoted between projecting brackets 372 and 373 on column 374 secured to the respective side of the base of the press. The arms are pivoted by the piston-cylinder assemblies 378 and are moved vertically by the elongated piston-cylinder assemblies 379. For a more detailed description of a loader which may be used with the present invention, reference may be had to applicants' aforenoted copending application filed even date herewith.

In any event, preliminary to the loading cycle of the press, the operator may position two green tires on the load stand in the phantom line positions seen at 360. With the loader elevated, the green tires are moved to the full line position in alignment with the loader chuck. At that point the loader chuck 362 descends to pick up the green tires simply holding them elevated in front of the press. The load stands then return to the phantom line position 360 to receive additional green tires. Accordingly, with the structure illustrated, there may be two green tires positioned ahead of each mold in the dual cavity press, one on the load stand in its phantom position 360 and one supported by the loading chuck in its elevated position.

Assuming two tires are being cured in the press, at the completion of the cycle, the clamp piston-cylinder assemblies 151 retract to the extent permitted by the selected height of the collar 174 and the stop tube 175 or the mold height adjustment of FIG. 6. In any event, the vertical downward movement of the bottom platen and thus the bottom mold plate will be only a relatively short distance. The sectional mold actuator will cause the top mold plate to follow opening the sectional molds 180 stripping the sectional molds from the tread portion of the tire. The pressure within the center mechanism is relieved or at least partially relieved to permit the press to open. To open the press, the breech lock ring 36 is rotated to align the teeth of the flange with the slots of the ring and extension of the piston-cylinder assembly 76 causes the press upper mold sections to move to the phantom line position 92 seen in FIG. 1. While the press is opening, the center mechanism 40 may elevate the bottom bead ring 188 from the recess 187 and with the center mechanism as disclosed in applicant's aforenoted copending application, the shaping bladder will be withdrawn from the tire.

With the tire elevated from the bottom mold plate, an unloader seen at 380 in back of each cavity of the press extends inwardly beneath the tire supported on the elevated bottom bead ring. Each unloader comprises basically two parallel bars 381 and 382 on which conveyor rolls 383 are mounted. The bars are rigidly interconnected by a pivot shaft 385 which is journaled on carriage 386 seen at 387 and 388. A short stroke piston-cylinder assembly 389 mounted on the carriage pivots the shaft 385 and thus the bars 381 and 382 from a horizontal position to the inclined position seen in FIG. 1. Each carriage is mounted on a rearwardly extending horizontal track 392 extending in cantilever fashion rearwardly of the press. Relatively long stroke piston-cylinder assemblies 393 are provided pivoted at 394 to the frame of the track with the rod 395 being connected to the respective carriage. A tire stop seen at 396 is also pivoted to each shaft 385 and projects above the plane of the bars 381 and 382 in the inclined position thereof. After the bars are beneath the cured tire and tilted, as the unloader extends rearwardly from the press cavity, the tire stops may engage an abutment pivoting them downwardly out of the path of the tire to permit the tire to roll off the inclined conveyor into a post cure inflator or onto a take-away conveyor. The bars when retracted return to a horizontal position.

With the press open and the cured tire removed, the loader 352 simply swings into the opening between the mold halves and moves vertically downwardly to deposit the tire on or close to the bottom bead ring to release the tire after the center mechanism has obtained control. After the tire is released the loader returns to its elevated pick-up position. The shuttle stand then positions another tire beneath the chuck and the loader descends to engage the tire and elevate it to its uppermost position. The load stand then swings back to its phantom line position 360 for receipt of another tire.

With the safety lock 93 released, the press may then commence closing by retraction of the piston-cylinder assembly 76. The head of the press continues down until the parts achieve the position seen more clearly in FIG. 5A or 12 whereupon the rings 36 are rotated mechanically to lock the press.

In such position, before the tooling is completely in its final position, the clamp piston-cylinder assemblies will be bottomed at the adjustable height and before cure commences, the clamp piston-cylinder assemblies will be extended at full pressure. The clamp piston-cylinder assemblies move a fairly short distance to close the mold parts as seen in FIG. 5B. In such position, the pistons of the clamp cylinder assemblies will be fairly close to the end of their extended stroke, as for example, approximately 15 mm. The total potential stroke with the embodiment of FIG. 5A may be on the order of 254 mm. while the reduced stroke obtained by the collar and stop tube may be on the order of 50 mm.

In any event, as the clamp cylinders come up to full clamp pressure, the reaction is through the lock ring 36 back to the base and accordingly the beam 48 or the arms 50 and 51 are not required to resist the clamping force. This greatly reduces the strength requirement for the structure of the press supporting the upper mold sections for opening and closing movement.

While the illustrated press is designed for the production of radial truck tires using platen technology, it will be appreciated that the present invention may be utilized also in the production of passenger tires, even larger tires, or tires using steam dome techniques. The press may also be employed with two piece molds.

In any event, it is believed apparent that there is provided a tire press of significantly reduced cost, maintenance, and energy consumption, while improving the quality of the tire.

Other modes of applying the principles of the invention may be employed, change being made as regards the details described, provided the features stated in any of the following claims or the equivalent of such being employed.

What is claimed is:

1. A tire press comprising opposed heated mold parts, hydraulic fluid clamp means operative to maintain the mold parts together during cure, and cooling barrier means between the heated mold parts and the hydraulic fluid of said clamp means operative to protect such fluid from heat degradation.

2. A tire press as set forth in claim 1 wherein said mold parts include a fixed top platen, said clamp means being in the base of the press, and lock means to secure the top platen to the base so that the forces of said clamp means react through said lock means back to said base.

3. A press as set forth in claim 1 wherein said mold parts include a movable bottom platen, said clamp means supporting said bottom platen.

4. A press as set forth in claim 2 wherein said clamp means comprise vertically oriented piston-cylinder assemblies with the projecting rods thereof supporting the underside of the bottom platen.

5. A press as set forth in claim 4 wherein said cooling barrier means comprises coolant passages in the projecting rods.

6. A press as set forth in claim 5 wherein said coolant passages extend axially of said rods throughout a substantial length thereof.

7. A press as set forth in claim 6 including at least two such passages ported near the bottom and interconnected near the top.

8. A dual cavity tire press comprising horizontally spaced mold cavities each including upper and lower cavity parts, a single post extending vertically between the cavities, a beam sleeved on said post for vertical movement and supporting the upper part of each cavity beneath the opposite outer ends thereof, and a fluid actuator system beneath the beam, and adjacent the post operative vertically to move the beam along the post to raise and lower the upper parts in order to open and close the press, said actuator system supporting the beam at substantially the center of gravity of the beam and the supported upper cavity parts.

9. A tire press as set forth in claim 8 wherein said post is offset from the plane through the axes of the cavities.

10. A tire press as set forth in claim 9 wherein said beam is V-shape.

11. A tire press as set forth in claim 10 wherein said actuator system is below the notch of the V.

12. A tire press as set forth in claim 11 wherein said actuator system is parallel to the post and pivoted to the beam substantially in vertical line with the center of gravity of the beam and supported upper cavity parts.

13. A tire press as set forth in claim 12 wherein said post is circular and including a guide rod parallel to the post passing through said beam to keep the beam from rotating on said post.

14. A tire press as set forth in claim 8 including means to lock the beam in elevated position independently of said actuator system.

15. A tire press as set forth in claim 8 wherein the lower part of each cavity is fixed, and further including breech lock means to lock the upper and lower cavity parts together during cure to avoid internal cavity pressure forces acting on said beam.

16. A tire press as set forth in claim 15 including a movable platen in said fixed lower part of said cavities, and hydraulic clamp means acting on said platens during cure.

17. A tire press as set forth in claim 16 wherein said hydraulic clamp means comprises four quadrant spaced piston-cylinder assemblies beneath each platen.

18. A tire press as set forth in claim 8 further including a vertical sleeve secured between the lower parts of the cavities, the lower end of said post being removably fitted in said sleeve.

19. A tire press comprising at least two tire cavities each including upper and lower cavity parts, a single post extending vertically and offset from said tire cavities, a horizontal beam sleeved on said post for vertical movement and supporting the upper part of the cavities beneath the outer ends thereof, and a fluid actuator system adjacent the post below the beam operative vertically to move the beam to open and close the press, said actuator system being parallel to the post and pivoted to the beam substantially in a vertical line through the center of gravity of the beam and the supported upper cavity parts.

20. A tire press as set forth in claim 19 wherein said post is circular and including a guide rod parallel to the post passing through said beam to keep the beam from rotating on said post.

21. A tire press as set forth in claim 19 including means to lock the beam in elevated position independently of said actuator.

22. A tire press as set forth in claim 19 wherein the lower part of each said cavity is fixed, and further including breech lock means to lock the upper and lower cavity parts together during cure to avoid internal cavity pressure forces acting on said beam.

23. A tire press as set forth in claim 22 including a movable platen in said fixed lower part of each said cavity, and hydraulic clamp means acting on each said platen during cure.

24. A tire press as set forth in claim 23 wherein said hydraulic clamp means comprises four quadrant spaced piston-cylinder assemblies beneath each said platen.

25. A tire press as set forth in claim 19 further including a vertical sleeve secured between the lower parts of the cavity, the lower end of said post being removably fitted in said sleeve.

26. A tire press comprising a press base, a bottom mold section mounted for limited vertical movement on said press base, a center mechanism in said press base, a top mold section removably positioned on said bottom mold section, means vertically to move said top mold section to open and close said press, mechanical lock means exterior only of the top mold section operative when engaged to hold said top mold section to said press base against vertical movement and within a short clamp-distance of said bottom mold section when said press is closed, and hydraulic lock means directly to urge said bottom mold section against said top mold section through such short clamping distance under high pressure after said mechanical lock means is engaged, said hydraulic lock means including multiple short stroke piston-cylinder assemblies connected between said bottom mold section and press base and arranged around the center mechanism beneath the bottom mold section.

27. The press of claim 26 including a long stroke piston-cylinder assembly connected between said top mold section and press base to open and close said press.

28. The press of claim 26 wherein said piston-cylinder assemblies are equally spaced around said center mechanism.

29. The press of claim 26 wherein said bottom mold section includes a movable bottom platen supported by said piston-cylinder assemblies and further including means for mounting said center mechanism in said press base for movement with said bottom platen.

30. The press of claim 29 wherein said piston-cylinder assemblies are four in number and are quadrant spaced with respect to said platen.

31. The press of claim 29 including means vertically to adjust the position of said piston-cylinder assemblies for mold height adjustment.

32. The press of claim 29 including adjustable mechanical stop means to limit the retraction stroke of said piston-cylinder assemblies in the event of reduced hydraulic pressure.

33. The press of claim 32 wherein said adjustable mechanical stop means includes the cylinders of said assemblies.

34. The press of claim 32 wherein said piston-cylinder assemblies each include a projecting rod, and said adjustable mechanical stop means includes a stop ring for each assembly, at least two grooves in the rod of each assembly operative to receive the ring at a selected vertical position along the rod, and a stop tube for each assembly on the cylinder and surrounding the rod of the assembly and operative to engage the ring to limit the retraction stroke of the assembly.

35. A hydraulic tire press comprising opposed mold parts, hydraulic clamp means operative to maintain the mold parts together during cure, means limiting the extent of retraction of said clamp means in the event of reduced hydraulic pressure, said hydraulic clamp means including a piston-cylinder assembly and said means limiting the extent of retraction including the cylinder of said assembly, and coolant passages extending through the rod of said piston-cylinder assembly.

36. A hydraulic tire press comprising opposed mold parts, hydraulic clamp means operative to maintain the mold parts together during cure, mold height adjustment means for said clamp means operative adjustably to limit the stroke of said clamp means during each cycle of the press, said mold parts including a movable bottom heating platen supported by said clamp means, and coolant passages in said clamp means isolating the heat of the cure from the actuating fluid of said clamp means.

37. A tire press comprising a base, a lower mold part mounted in said base for slight vertical movement, an upper mold part, means to move the upper mold part for opening and closing the press, mechanical lock means to lock said upper mold part to the base, and hydraulic clamp means in said base beneath said lower mold part operative to clamp said lower mold part to the upper mold part when the press is closed for curing a tire between the mold parts, said clamp means including means to extract heat from between said lower mold part and the hydraulic fluid.

38. A hydraulic tire press comprising opposed mold parts including a movable bottom platen, hydraulic clamp means operative to maintain the mold parts together during cure, said hydraulic clamp means including a plurality of piston-cylinder assemblies supporting said bottom platen and each including a projecting rod, and means limiting the extent of retraction of said hydraulic clamp means in the event of reduced hydraulic pressure, said last mentioned means including a stop ring for each assembly, at least two grooves in the rod of each assembly operative to receive the ring at a selected vertical position along the rod, said grooves in the rod being at respective common elevations with the grooves in the other rods, and a stop tube for each assembly on the cylinder and surrounding the rod of the assembly and operative to engage the ring on the rod to limit the extent of retraction.

39. A press as set forth in claim 38 including coolant passages in the projecting rods of said piston-cylinder assemblies isolating the heat of said platen from the hydraulic fluid of said piston-cylinder assemblies.

40. A dual cavity tire press comprising horizontally spaced mold cavities each including an upper and lower cavity part, a single post extending vertically between said mold cavities, a beam mounted on said post for vertical movement and supporting the upper cavity part of each mold cavity beneath the opposite outer ends thereof, a fluid actuator adjacent the post operative vertically to move the beam to open and close the mold cavities, and means to lock the beam in an elevated position independently of said actuator, said last mentioned means including a post cap, a projection on said beam adapted to project through said post cap in the elevated position of said beam, and a latch on said post cap operative to engage said projection to hold said beam elevated.

41. A tire press comprising opposed upper and lower cavity parts, a single post extending vertically and offset from said cavity parts, a beam mounted on said post for vertical movement and supporting said upper cavity part beneath the outer end thereof, a fluid actuator adjacent the post operative vertically to move the beam to open and close the press, and means to lock the beam in elevated position independently of said actuator, said last mentioned means including a post cap, a projection on said beam adapted to project through said post cap in the elevated position of said beam, and a latch on said post cap operative to engage said projection to hold said beam elevated.

42. A tire press comprising relatively vertically movable upper and lower mold parts, a beam supporting the upper mold part for vertical movement to open and close the press, a fluid actuator offset from the mold parts operative to move the beam vertically, and thus the upper mold part to open and close the press, mechanical lock means to lock the upper mold part closed when the press is closed, hydraulic clamp means beneath the lower mold part operative to clamp the lower mold part to the upper mold part when the press is closed and during cure of the tire, said hydraulic clamp means including at least two piston-cylinder assemblies arranged around the axis of the mold parts and each assembly including a projecting rod, and means to extract heat from the rods of said piston-cylinder assemblies.

* * * * *

REEXAMINATION CERTIFICATE (324th)

United States Patent [19]

Singh et al.

[11] B1 4,332,536

[45] Certificate Issued Mar. 26, 1985

[54] HYDRAULIC TIRE PRESS

[75] Inventors: Anand P. Singh, Youngstown, Ohio; Daniel Schichman, Trumbull, Conn.

[73] Assignee: NRM Corporation, Akron, Ohio

Reexamination Request:
No. 90/000,391, Jun. 6, 1983

Reexamination Certificate for:
Patent No.: 4,332,536
Issued: Jun. 1, 1982
Appl. No.: 138,589
Filed: Apr. 9, 1980

[51] Int. Cl.³ .................. B29H 5/02; B29H 5/08
[52] U.S. Cl. .................. 425/33; 425/34 R; 425/40; 425/47

[56] References Cited

U.S. PATENT DOCUMENTS

| | | |
|---|---|---|
| 3,522,626 | 8/1970 | Balle ................... 425/38 |
| 3,770,858 | 11/1973 | Ireland et al. |
| 3,870,443 | 3/1975 | Schatz |
| 3,936,251 | 2/1976 | Billey |
| 4,013,389 | 3/1977 | MacMillan |
| 4,035,118 | 7/1977 | MacMillan |
| 4,076,473 | 2/1978 | MacMillan |
| 4,212,605 | 7/1980 | MacMillan |

*Primary Examiner*—Jan H. Silbaugh

[57] ABSTRACT

A dual cavity hydraulic tire press utilizes a single long stroke piston-cylinder assembly vertically positioned substantially in line with the center of gravity of the vetically movable upper mold sections, the latter being supported on the underside of the outer ends of a shallow V-shaped beam which is mounted for vertical movement on a readily removable column or post. In the closed position of the press the top mold cavities are locked to the base of the press by rotatable bayonet locks. Four short stroke hydraulic clamp piston-cylinder assemblies are positioned beneath each bottom mold section to achieve clamping pressure during cure and are provided with extended coolant passages between the clamp actuating fluid and the heat of the mold cavity to preclude degradation of the fluid employed.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-25 and 35-42 is confirmed.

Claim 26 is determined to be patentable as amended.

Claims 27-34, dependent on an amended claim, are determined to be patentable.

New claims 43-46 are added and determined to be patentable.

26. A tire press comprising a press base, a bottom mold section mounted for limited vertical movement on said press base, a center mechanism in said press base, a top mold section removably [positioned] *positionable* on said bottom mold section, means vertically to move said top mold section to open and close said press, *said bottom and top mold sections including respective mold parts and means to heat said mold parts to a high temperature for cure of a tire located between the mold parts,* mechanical lock means exterior only of the top mold section operative when engaged to hold said top mold section to said press base against vertical movement and within a short clamp-distance of said bottom mold section when said press is closed, [and] hydraulic lock means directly to urge said bottom mold section against said top mold section through such short clamping distance under high pressure after said mechanical lock means is engaged, said hydraulic lock means including multiple short stroke piston-cylinder assemblies connected between said bottom mold section and press base and arranged around the center mechanism beneath the bottom mold section, *and heat isolation means located between said bottom mold section and piston-cylinder assemblies for protecting the hydraulic fluid of said hydraulic lock means from heat degradation due to the high temperature of said mold parts.*

*43. The press of claim 26 wherein insulation is located beneath said bottom mold section, and said piston-cylinder assemblies are located beneath said insulation and connected to said bottom mold section by rods extending through said insulation.*

*44. The press of claim 43 wherein said bottom mold section includes a movable bottom platen engaged by said rods while said piston-cylinder assemblies are spaced a substantial distance beneath said bottom platen.*

*45. The press of claim 44 wherein said insulation is carried on the underside of said bottom platen.*

*46. The press of claim 26 wherein said piston-cylinder assemblies are connected to said bottom mold section by rods including coolant passages therein.*

* * * * *